(12) United States Patent
Nishino et al.

(10) Patent No.: US 7,797,290 B2
(45) Date of Patent: Sep. 14, 2010

(54) DATABASE REORGANIZATION PROGRAM AND METHOD

(75) Inventors: Mitsuhide Nishino, Kawasaki (JP); Hisayuki Enbutsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 11/174,766

(22) Filed: Jul. 5, 2005

(65) Prior Publication Data

US 2006/0206543 A1   Sep. 14, 2006

(30) Foreign Application Priority Data

Mar. 9, 2005 (JP) .............................. 2005-065347

(51) Int. Cl.
*G06F 7/00* (2006.01)

(52) U.S. Cl. ............... 707/696; 707/693; 707/695; 707/641; 707/792; 711/113

(58) Field of Classification Search ................ 707/1, 707/2, 5, 100, 101, 102, 103, 104, 200, 201, 707/202, 205, 203; 709/170, 172; 711/113; 717/172

See application file for complete search history.

(56) References Cited

U.S. PATENT DOCUMENTS

| | | | | | |
|---|---|---|---|---|---|
| 4,875,155 | A | * | 10/1989 | Iskiyan et al. ............... | 711/113 |
| 5,247,665 | A | * | 9/1993 | Matsuda et al. ............. | 707/101 |
| 5,687,361 | A | * | 11/1997 | Sarkar ............................ | 707/1 |
| 5,778,392 | A | * | 7/1998 | Stockman et al. ........... | 707/205 |
| 6,026,412 | A | * | 2/2000 | Sockut et al. ................ | 707/200 |
| 6,105,038 | A | * | 8/2000 | Douceur et al. ............. | 707/201 |
| 6,105,039 | A | * | 8/2000 | Douceur et al. ............. | 707/201 |
| 6,122,640 | A | * | 9/2000 | Pereira .................... | 707/103 R |
| 6,343,296 | B1 | * | 1/2002 | Lakhamraju et al. .... | 707/103 R |
| 7,000,230 | B1 | * | 2/2006 | Murray et al. ............... | 717/172 |
| 7,117,229 | B2 | * | 10/2006 | Marshall et al. ............. | 707/200 |
| 7,228,309 | B1 | * | 6/2007 | Fisher ......................... | 707/102 |
| 2001/0047360 | A1 | * | 11/2001 | Huras et al. .................. | 707/102 |
| 2004/0103079 | A1 | * | 5/2004 | Tokusho et al. ................ | 707/1 |
| 2005/0010590 | A1 | * | 1/2005 | Blaicher ...................... | 707/102 |
| 2005/0038834 | A1 | * | 2/2005 | Souder et al. ............... | 707/203 |
| 2005/0165713 | A1 | * | 7/2005 | Lafforet ......................... | 707/1 |
| 2006/0036618 | A1 | * | 2/2006 | Shuma et al. ............... | 707/100 |
| 2006/0080324 | A1 | * | 4/2006 | Bower et al. ................. | 707/100 |
| 2006/0123032 | A1 | * | 6/2006 | Manapetty et al. .......... | 707/101 |
| 2006/0143238 | A1 | * | 6/2006 | Tamatsu ...................... | 707/200 |
| 2007/0078909 | A1 | * | 4/2007 | Tamatsu ...................... | 707/203 |

FOREIGN PATENT DOCUMENTS

JP   5-151037   6/1993

(Continued)

*Primary Examiner*—Pierre M Vital
*Assistant Examiner*—Mohammad S Rostami
(74) *Attorney, Agent, or Firm*—Greer, Burns & Crain, Ltd.

(57) ABSTRACT

A database reorganization program to reorganize a database with minimizing memory consumption. When a command for reorganizing a database is issued, a record reorganization unit sequentially selects a page of a basic area with reference to an index, and moves the records of the selected page into new destination pages of an expanded database with reference to an expansion index. In addition, the record reorganization unit updates a page state table showing a reorganization progress for each page of the database.

8 Claims, 14 Drawing Sheets

| | FOREIGN PATENT DOCUMENTS | |
|---|---|---|
| JP | 7-160565 | 6/1995 |
| JP | 2000-339210 | 12/2000 |
| JP | 2003-006021 | 1/2003 |
| JP | 2004-132350 | 4/2004 |
| JP | 2005-316624 | 11/2005 |

* cited by examiner

DATABASE REORGANIZATION PROGRAM AND METHOD

CROSS-REFERENCE TO RELATED APPLICATIONS

This application is based upon and claims the benefits of priority from the prior Japanese Patent Application No. 2005-065347, filed on Mar. 9, 2005, the entire contents of which are incorporated herein by reference.

BACKGROUND OF THE INVENTION (1) Field of the Invention

This invention relates to a database reorganization program and method and, more particularly, to a database reorganization program and method for reorganizing a database with minimizing memory consumption.

(2) Description of the Related Art

In many database systems, databases may be reorganized so as to keep efficient data input/output operation. For example, there are following reasons:

1. Combination of free spaces between records in a page (fragmentation reduction)

2. Improvement of access performance by storing records of overflow pages into prime pages 3. Area expansion before a database becomes full of records.

In general reorganization methods, a new database with a larger capacity than an original database is first prepared. Then the records of the original database are all copied in the new database (for example, refer to Japanese Unexamined Patent Publication No. 2000-339210). This technique will be now described.

FIG. 14 shows a general method of reorganizing a database 941 into a database 951.

In this method, the database 951 (copy destination) with a larger capacity than the database 941 is newly prepared differently from the database 941 (copy source) that is used by processing functions. The databases 941 and 951 have corresponding indexes 942 and 952. In addition, each of the databases 941 and 951 has a prime page area 941a, 951a for storing plural prime pages and an overflow page area 941b, 951b for storing plural overflow pages.

Then, the database reorganization is performed by copying the records of the database 941 in the database 951 in order from the first page (step S111). During this process, a transaction 961 requesting for updating records in the database 941 is acceptable. This transaction 961, for example, changes a record (record number R1) of the prime page and adds a record (record number R33) to the overflow page (step S112) in the database 941. During the reorganization, the contents of such update operation are recorded in an update log 943 (step S113).

When an application program requests for updating records of the database 951 thereafter, the update log 943 regarding the records is reflected on the database 951 (step S114). In other words, the records to be updated in the database 951 are overwritten based on the update log 943, so as to maintain consistency. This database reorganization method is referred to as DBsnapper.

According to this method shown in FIG. 14, the copy destination database is newly prepared. Therefore, even little capacity expansion creates a new copy destination database with a larger capacity than a copy source database. That is, memory space larger than twice the amount of data to be copied is required, and the copy source database becomes useless after copy. In short, a space problem for databases and a maintenance cost problem arise.

SUMMARY OF THE INVENTION

This invention has been made in view of foregoing and intends to provide a database reorganization program and method for reorganizing a database with minimizing memory consumption.

The database reorganization program causes a computer to reorganize a database having plural pages in a basic area for storing records defined by an index. With this program, the computer functions as: an expanded database creator for newly creating an expanded area to create an expanded database having the basic area and the expanded area, in response to a database reorganization command; an expansion index creator for creating an expansion index redefining the records so as to store them in the pages of the basic area and the expanded area; and a record reorganization unit for selecting a page of the basic area with reference to the index, moving the records of the selected page into destination pages of the expanded database with reference to the expansion index, and updating a page state table showing a reorganization progress for each page of the basic area of the expanded database.

The database reorganization method reorganizes a database having plural pages in a basic region for storing records defined by an index. In this method, an expanded database creation means newly creates an expanded area to create an expanded database having the basic area and the expanded area, in response to a database reorganization command, an expansion index creator creates an expansion index redefining the records so as to store them in the pages of the basic area and the expanded area, and a record reorganization means selects a page of the basic area with reference to the index, moves the records of the selected page into destination pages of the expanded database with reference to the expansion index, and updates a page state table showing a reorganization progress for each page of the basic area of the expanded database.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of this invention will be described with reference to the accompanying drawings.

This invention that is implemented in one embodiment is first outlined and then specific operation of the embodiment will be described.

Figure 1:
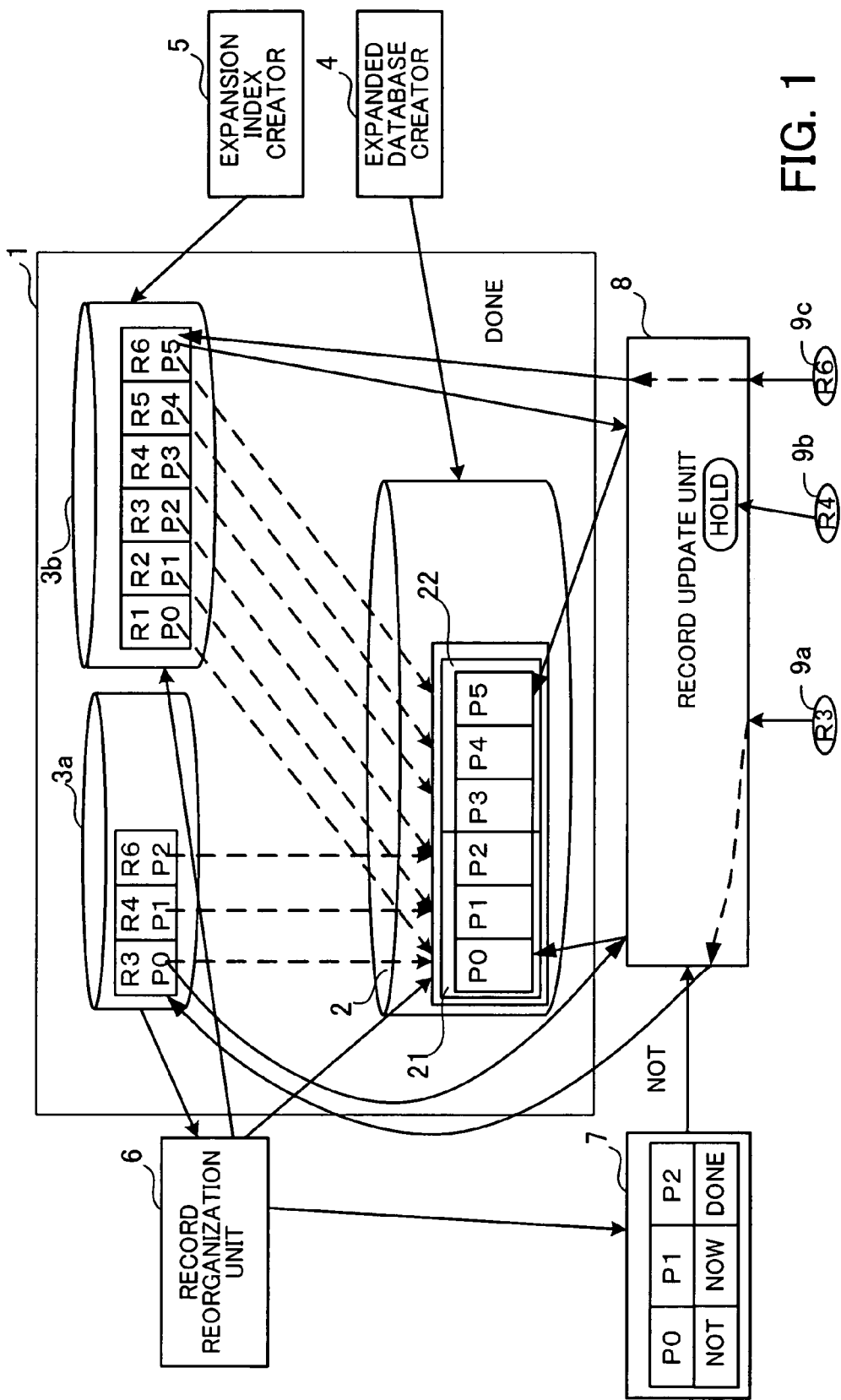
FIG. 1 is a conceptual view of the present invention which is implemented in one embodiment.

FIG. 1 is a conceptual view of this invention which is applied to this embodiment. This figure shows an example of reorganizing a database into an expanded database 2 in a memory unit 1.

The expanded database 2 has a basic area 21 and an expanded area 22. The basic area 21 is an area which exists in the original database. The expanded area 22 is a newly added area in the reorganization.

Each of the basic area 21 and the expanded area 22 has plural pages. Referring to FIG. 1, the basic area 21 has pages P0, P1, and P2. The expanded area 22 has pages P3, P4, and P5. Records to be stored in the pages of the original database are defined by an index 3a. When a record in the expanded database 2 is updated, the processing contents are logged.

The index 3a and an expansion index 3b of FIG. 1 show correspondence between record number (Rm: m is an integral number of 0 or greater) and page number (Pn: n is an integral number of 0 or greater). Each page can store records with record numbers which are a corresponding record number set in the index 3a or the expansion index 3b or less and are greater than a record number associated with one less page number.

An expanded database creator 4 newly prepares an expanded area to create the expanded database 2 having the basic area 21 and the expanded area 22 in response to a database reorganization command.

The expansion index creator 5 creates the expansion index 3b which defines records so as to store them in the basic area 21 and the expanded area 22.

A record reorganization unit 6 selects an unorganized page, which will be described later, in the basic area 21 with reference to the index 3a. Then the record reorganization unit 6 moves the records of the selected page into destination pages of the expanded database 2 with reference to the expansion index 3b. In addition, the record reorganization unit 6 updates a page state table 7 which shows a reorganization progress for each page of the original database. This progress is classified into an unorganized state (Not), an under-reorganization state (Now), and a reorganized state (Done)

A record update unit 8 writes an update record depending on the state of a corresponding page with reference to the page state table 7 in response to a command for writing the update record. Specifically, when the corresponding page of the expanded database 2 is unorganized, the record update unit 8 writes the update record in a final destination page of the expanded database 2 with reference to the index 3a. When the corresponding page has been reorganized, the record update unit 8 writes the update record in a final destination page of the expanded database 2 with reference to the expansion index 3b. When the corresponding page is under reorganization, the record update unit 8 writes the update record in the expanded database 2 after the corresponding page is reorganized.

In such a database reorganization device, when a database reorganization command is issued, the record reorganization unit 6 sequentially selects a page of the basic area 21 with reference to the index 3a and moves the records of the selected page into destination pages of the expanded database 2 with reference to the expansion index 3b. At this time, the record reorganization unit 6 updates the page state table 7 which shows a reorganization progress for each page of the basic area of the expanded database 2. That is, this page state table 7 shows whether reorganization has been completed, for each of pages which are set in the index 3a and store the records of the original database.

Assume now that pages are selected in decreasing order, P2, P1, and P0. Referring to FIG. 1, the page stage table 7 shows that the pages P0, P1, and P2 are in an unorganized state, an under-reorganization state, and a reorganized state, respectively.

When a command for writing an update record is issued while the database is reorganized, the record update unit 8 searches the page state table 7 for the state of a corresponding page.

In a case where a record R3 is an update record 9a, the page P0 of the original database is determined as a corresponding page. Since it is recognized in FIG. 1 that this page P0 is unorganized, the update record 9a is written in the final destination page P0 of the expanded database 2 with reference to the index 3a.

In a case where a record R4 is an update record 9b, the page P1 of the original database is determined as a corresponding page. FIG. 1 shows that the page P1 is under reorganization. Therefore, after the state of this page is changed to a reorganized state, the update record 9b is written in the final destination page P3 of the expanded database 2 with reference to the expansion index 3b.

In a case where a record R6 is an update record 9c, the page P2 of the original database is determined as a corresponding page. Since FIG. 1 shows that the page P2 has been reorganized, the update record 9c is written in the final destination page P5 of the expanded database 2 with reference to the expansion index 3b.

With the above procedure, the database is reorganized without interrupting such update of records. Although update of a record in a page being reorganized starts after this page is reorganized, one page is reorganized at once and therefore this can not stop operation.

One embodiment of this invention will be now described in detail.

Figure 2:
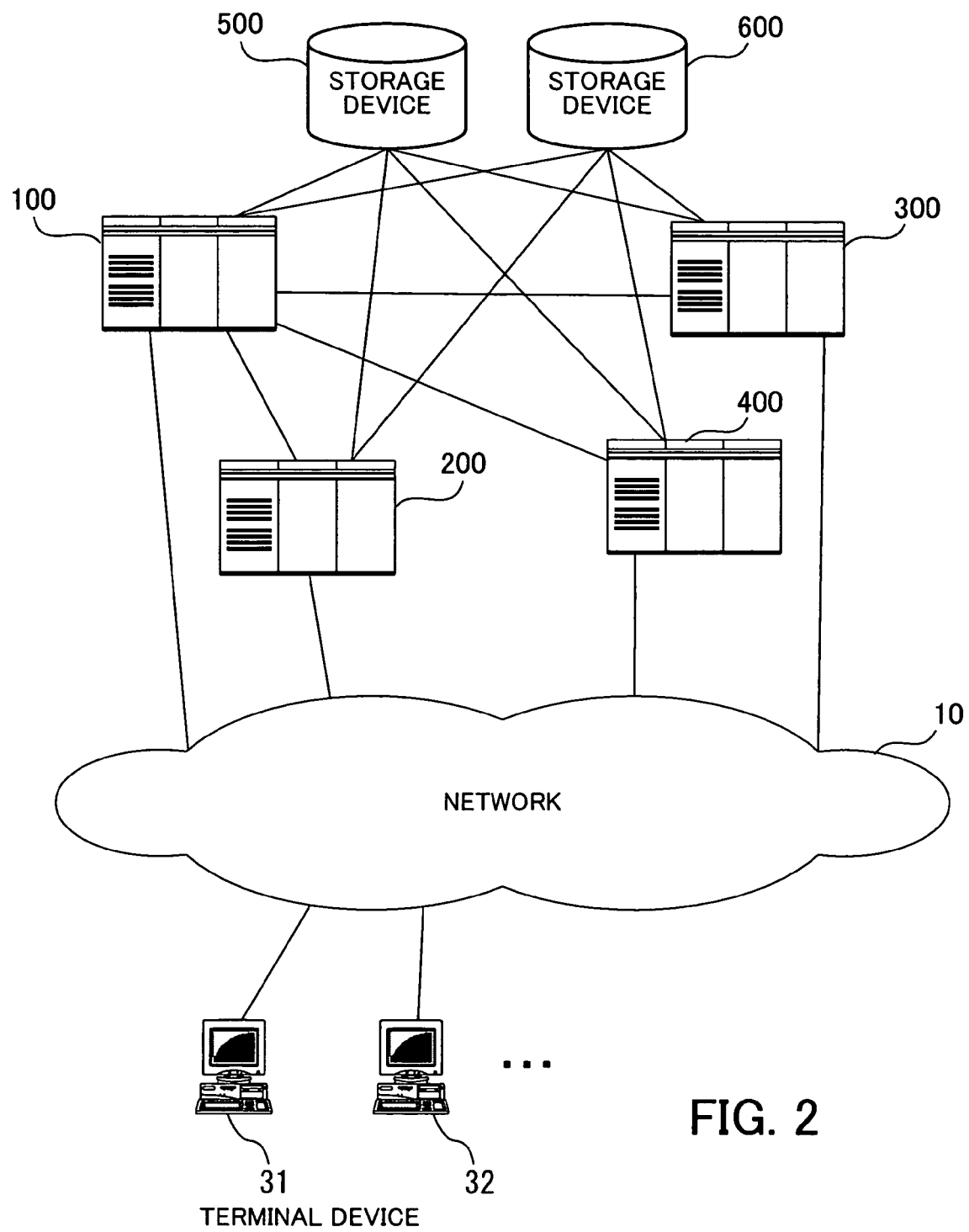
FIG. 2 shows an example of a system configuration according to the embodiment of this invention.

FIG. 2 shows a system configuration of the embodiment of this invention. In this embodiment, a plurality of host computers 100, 200, 300, and 400 are connected to a plurality of terminal devices 31, 32, . . . over a network 10. The host computers 100, 200, 300, and 400 are connected to storage devices 500 and 600. The host computer 100 is connected to the other host computers 200, 300, and 400 with high-speed communication lines. The host computers 200, 300, and 400 can access a shared memory of the host computer 100 with the communication lines.

The host computers 100, 200, 300, and 400 execute transactions against the databases of the storage devices 500 and 600 in response to commands sent from the terminal devices 31, 32, . . . via the network 10. At least one host computer has a processing function to reorganize the databases. In this embodiment, the host computer 100 is designed to reorganize the databases, with a following hardware configuration.

Figure 3:
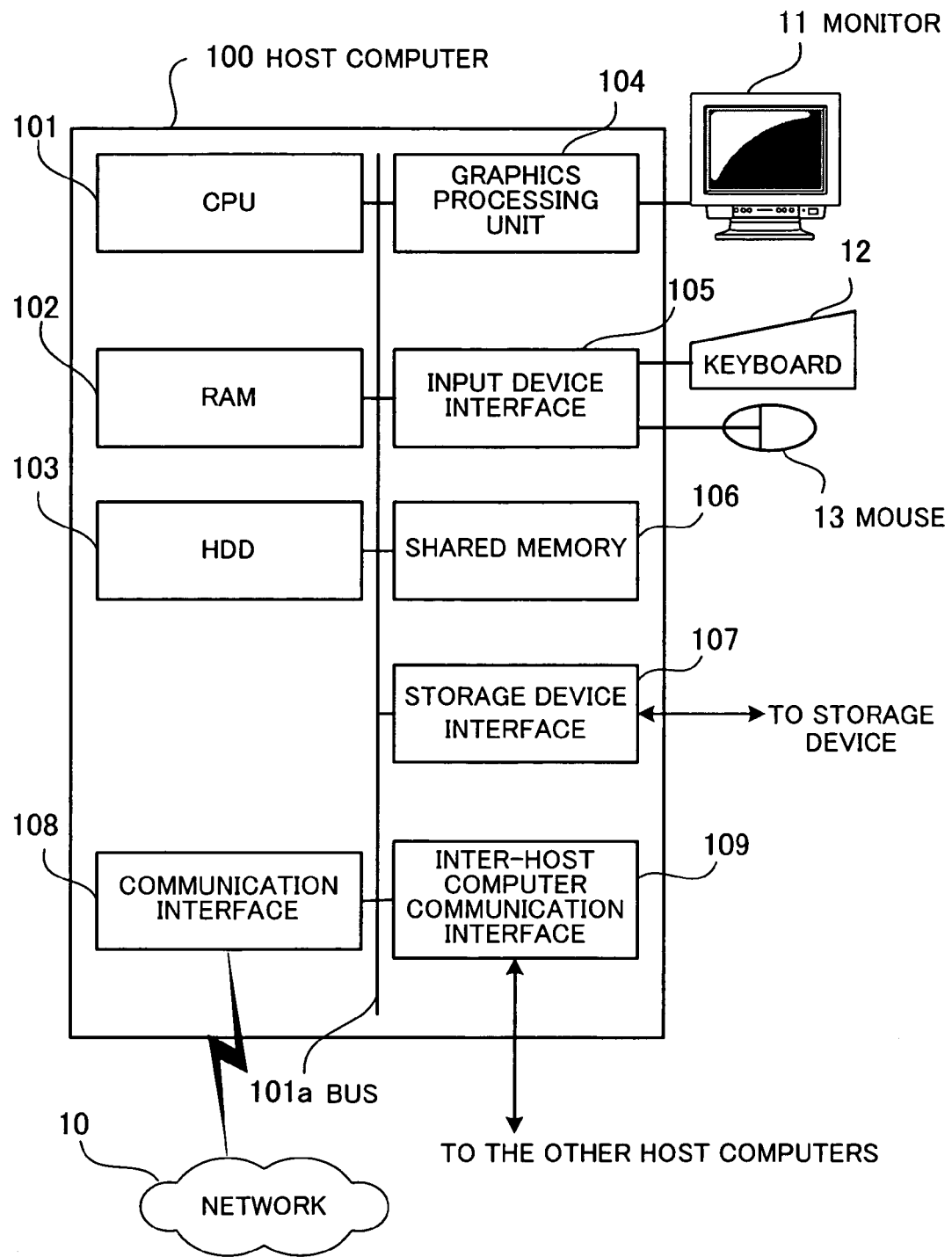
FIG. 3 shows an example of a hardware configuration of a host computer which reorganizes a database.

FIG. 3 shows a hardware configuration of the host computer which performs the database reorganization. The host computer 100 is entirely controlled by a Central Processing Unit (CPU) 101. The CPU 101 is connected via a bus 101a to a Random Access Memory (RAM) 102, a Hard Disk Drive (HDD) 103, a graphics processing unit 104, an input device interface 105, a shared memory 106, a storage device interface 107, a communication interface 108, and an inter-host computer communication interface 109.

The RAM 102 temporarily stores at least part of an Operating System (OS) program and application programs to be executed by the CPU 101. In addition, the RAM 102 stores various kinds of data for CPU processing. When a database is reorganized, a page state table showing the sate of each block of the database is also stored in the RAM 102. The HDD 103 stores the OS and application programs.

The graphics processing unit 104 is connected to a monitor 11. The graphics processing unit 104 displays images on the monitor 11 under the control of the CPU 101. The input device interface 105 is connected to a keyboard 12 and a mouse 13. The input device interface 105 transfers signals from the keyboard 12 and the mouse 13 to the CPU 101 via the bus 101a.

The shared memory 106 is a recording medium which can be shared with the other host computers 200, 300 and 400. When a database is reorganized, this shared memory 106 functions as a table data storage unit to store the contents of the page state table at prescribed timing. This page state table and the table data storage unit will be described in detail later. A battery-backup semiconductor memory may be used as the shared memory 106.

The storage device interface 107 is connected to the storage devices 500 and 600. The storage device interface 107 inputs/outputs data to/from the storage devices 500 and 600 under the control of the CPU 101.

The communication interface 108 is connected to the network 10. The communication interface 108 communicates data with the terminal devices 31, 32, . . . over the network 10.

The inter-host computer communication interface 109 is connected to the other host computers 200, 300 and 400. This inter-host computer communication interface 109 communicates data with the other host computers 200, 300 and 400. For example, the inter-host computer communication interface 109 sends information being stored in the shared memory 106, to the host computers 200, 300 and 400.

With the above hardware configuration, the processing functions of this embodiment will be realized. The other host computers 200, 300 and 400 can have the same hardware configuration as the host computer 100 as well. In this connection, the host computers 200, 300, 400 may not have a shared memory.

The database reorganization process in the system shown in FIGS. 2 and 3 will be now described in detail.

Figure 4:
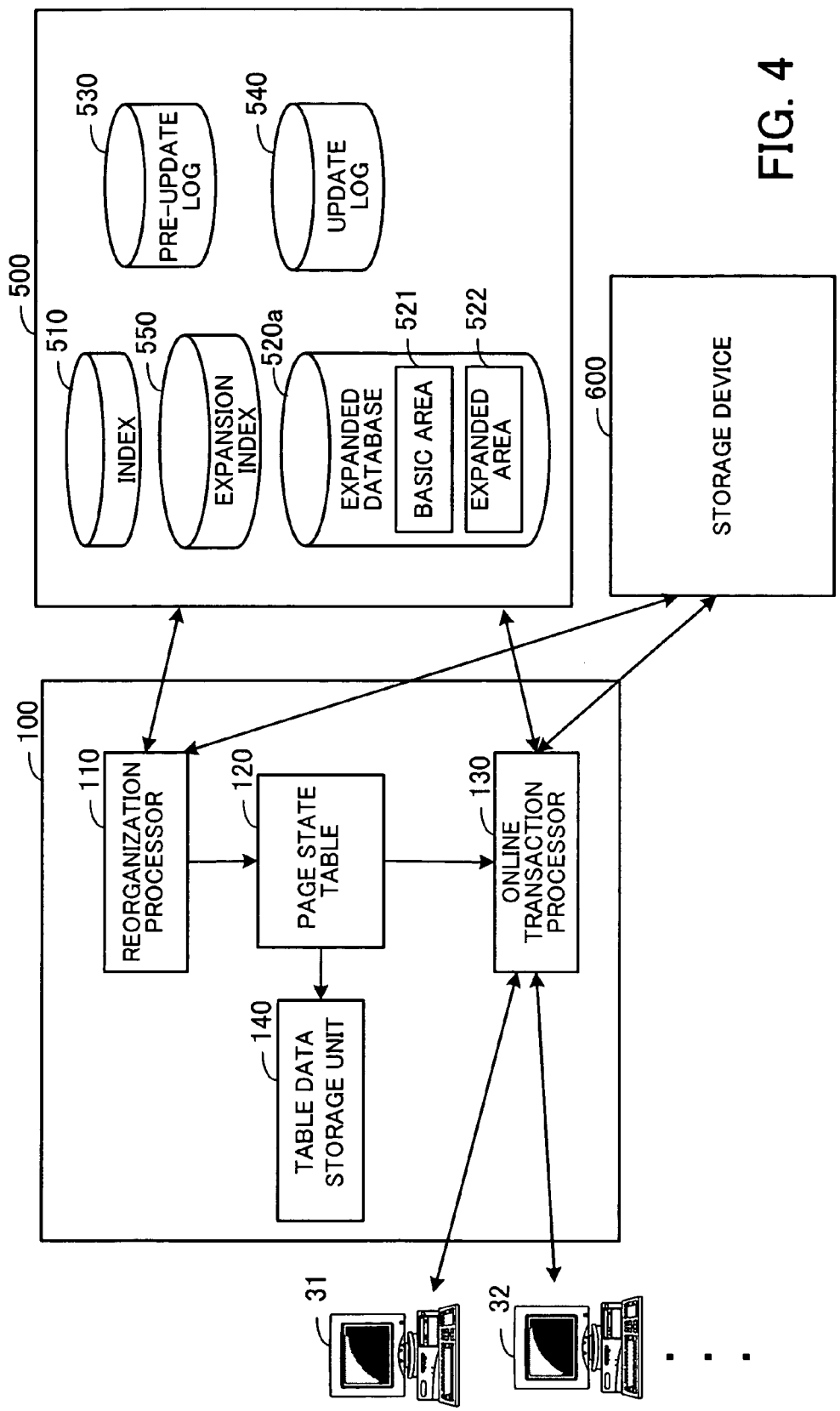
FIG. 4 is a functional block diagram for the embodiment.

FIG. 4 is a functional block diagram of this embodiment. FIG. 4 shows an example of reorganizing a database into an expanded database 520a in the storage device 500.

The host computer 100 is connected to the storage devices 500 and 600.

The storage device 500 has an index 510, an expansion index 550, the expanded database 520a having a basic area 521 and an expanded area 522, a pre-update log 530, and an update log 540. Before the database reorganization, the expanded area 522 and the expansion index 550 do not exist, and the terminal devices 31, 32, . . . , use the database having the basic area 521 with reference to the index 510, the pre-update log 530, and the update log 540.

The index 510 defines, with identification numbers (record numbers), records to be stored in the pages of the basic area 521. The expansion index 550 redefines, with the identification numbers (record numbers), the records so as to store them in the pages of the basic area 521 and expanded area 522 after the reorganization is completed. Each of the basic area 521 and the expanded area 522 is a memory area which is divided into plural pages. That is, the expanded database 520a has storage capacities of the basic area 521 and the expanded area 522. Records are stored in pages specified by the index 510 before data reorganization while records are stored in pages specified by the expansion index 550 after the data reorganization.

When records are updated, the pre-update log 530 and the update log 540 store the pre-update contents and updated contents of the records of the original database or the expanded database 520a, respectively.

The host computer 100 has a reorganization processor 110, a page state table 120, an online transaction processor 130, and a table data storage unit 140.

The reorganization processor 110 reorganizes a database. Specifically, when the reorganization processor 110 receives a database reorganization command, it creates the above-described expansion index 550 and expanded area 522 in the storage device 500. Therefore, the expanded database 520a has a larger storage capacity than the original database by the capacity of the expanded area 522. The reorganization processor 110 reorganizes the records of the expanded database 520a page by page, and at the same time updates the page state table 120. This page state table 120 shows a reorganization progress for each page of the basic area of the expanded database 520a during the database reorganization. This progress is classified into an unorganized state, an under-reorganization state, and a reorganized state.

The online transaction processor 130 executes transactions against the database in response to commands from the terminal devices 31, 32, . . . . During the database reorganization, the online transaction processor 130 searches the page state table 120 for the state of a database to be accessed.

The table data storage unit 140 stores the registered contents of the page state table 120 in the shared memory 106 when the page state table 120 is updated.

Figure 5:
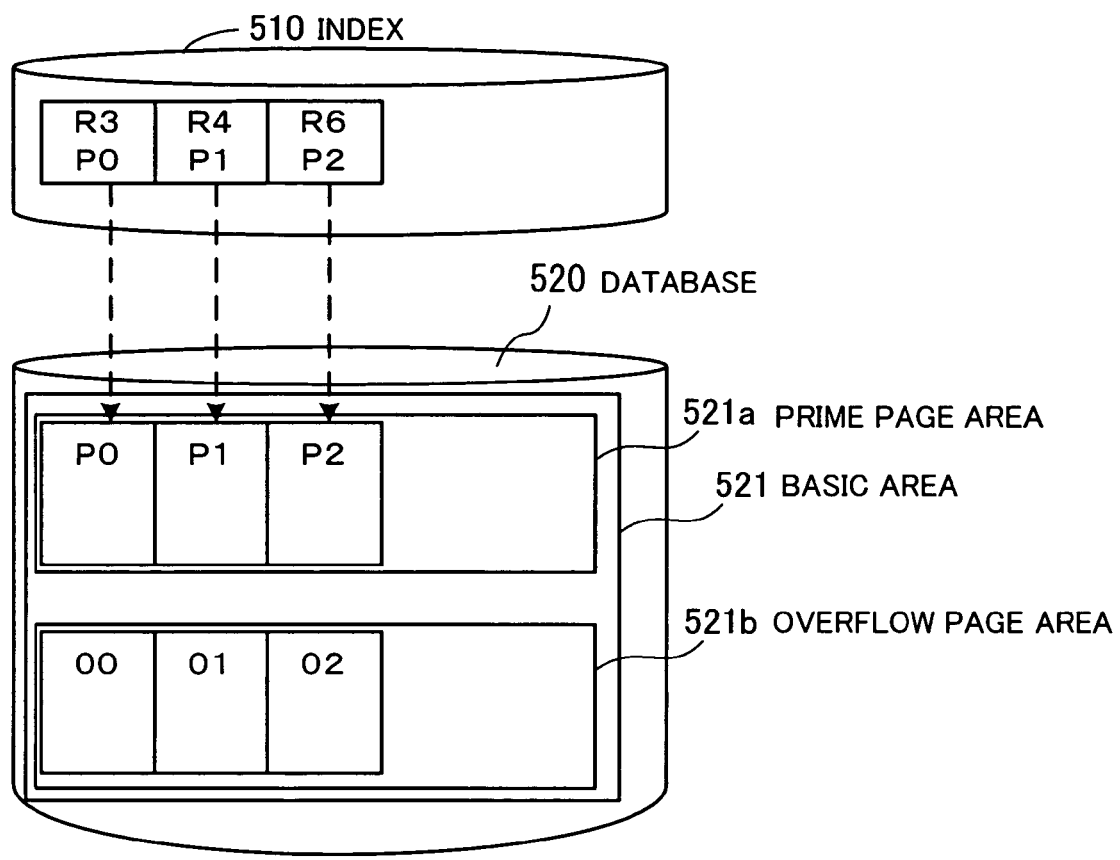
FIG. 5 shows data structures of an index and a database.

FIG. 5 shows data structures of an index and a database. With reference to this figure, the relation between the index 510 and the database 520 will be now described.

A database 520 is a database before the expanded area 522 is created.

The index 510 associates the record numbers of records to be stored in pages, with the page numbers (page numbers and record numbers are represented by Pm and Rn, respectively). Records with smaller record numbers are assigned to pages with smaller page numbers for efficient transaction processing. In this index 510, the maximum record number among the records to be stored in each page is set in association with the page number of the page.

Referring to FIG. 5, a record number R3 is set in association with a page number P0 in the index 510. This means that records R0x to R3x (x is an integral number of 0 or larger) are stored in the page P0. Further, since a record number R4 is set in association with a page number P1, records R4x are stored in the page P1. Furthermore, since a record number R6 is set in association with a page number P2, records R5x and R6x are stored in the page P2.

When the database 520 is a network database (NDB), a plurality of data linked to each other in a tree structure are included in a record. In this case, this data link in the original database 520 is maintained in the expanded database 520a.

The basic area 521 of the database 520 has a prime page area 521a for storing plural prime pages and an overflow page area 521b for storing plural overflow pages. The page numbers of the prime pages are set in the index 510, and each prime page stores only records defined by the index 510. The overflow pages store records which cannot be stored in the corresponding prime pages due to lack of capacity. When a record is stored in an overflow page, a pointer leading to the overflow page is set in the corresponding prime page. That is, the overflow page storing the record can be detected based on the pointer.

As described above, records to be stored in each prime page are previously defined. When a record cannot be stored in a corresponding prime page due to lack of capacity, the record is stored in an overflow page.

Increase in an amount of records being stored in the overflow pages deteriorates access efficiency to the database 520. To access a desired record, the online transaction processor 130 first searches the index 510 for a prime page storing the record. Then the online transaction processor 130 accesses the prime page to find the record. When the record does not exist, however, the online transaction processor 130 finds an overflow page based on a pointer being registered in the prime page to access the record. Now, it should be noted that the online transaction processor 130 cannot directly detect the overflow page storing the record, which deteriorates access efficiency. Therefore, when the amount of records increases in the overflow pages, the database is reorganized in order to increase the capacity of the prime pages. In the reorganization of the database 520, the records of the database 520 are reorganized page by page. At this time, the states of the prime pages of the basic area 521 are managed with the page state table 120.

Figure 6:
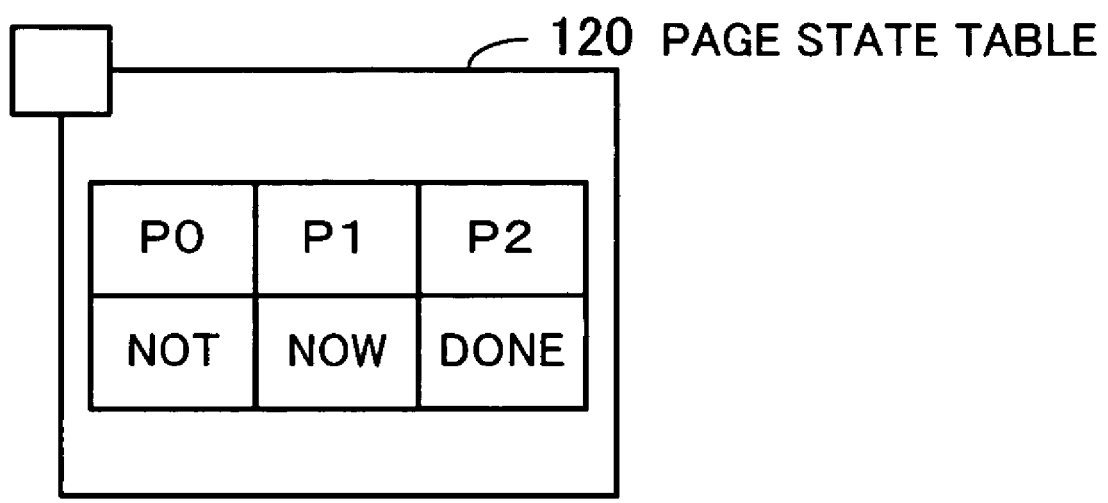
FIG. 6 shows an example of a data structure of a page state table.

FIG. 6 shows an example of a data structure of the page state table. The page state table 120 shows a reorganization progress for each prime page of the database 520. This progress is classified into an unorganized state (Not), an under-reorganization state (Now), and a reorganized state (Done). The unorganized state means that the records of a page have not been reorganized. The under-reorganization state means that the records of a page are under reorganization. The reorganized state means that the records of a page have been reorganized.

In this embodiment, the data reorganization and the online transactions can be simultaneously performed. Next explanation is about how to execute these processes.

Figure 7:
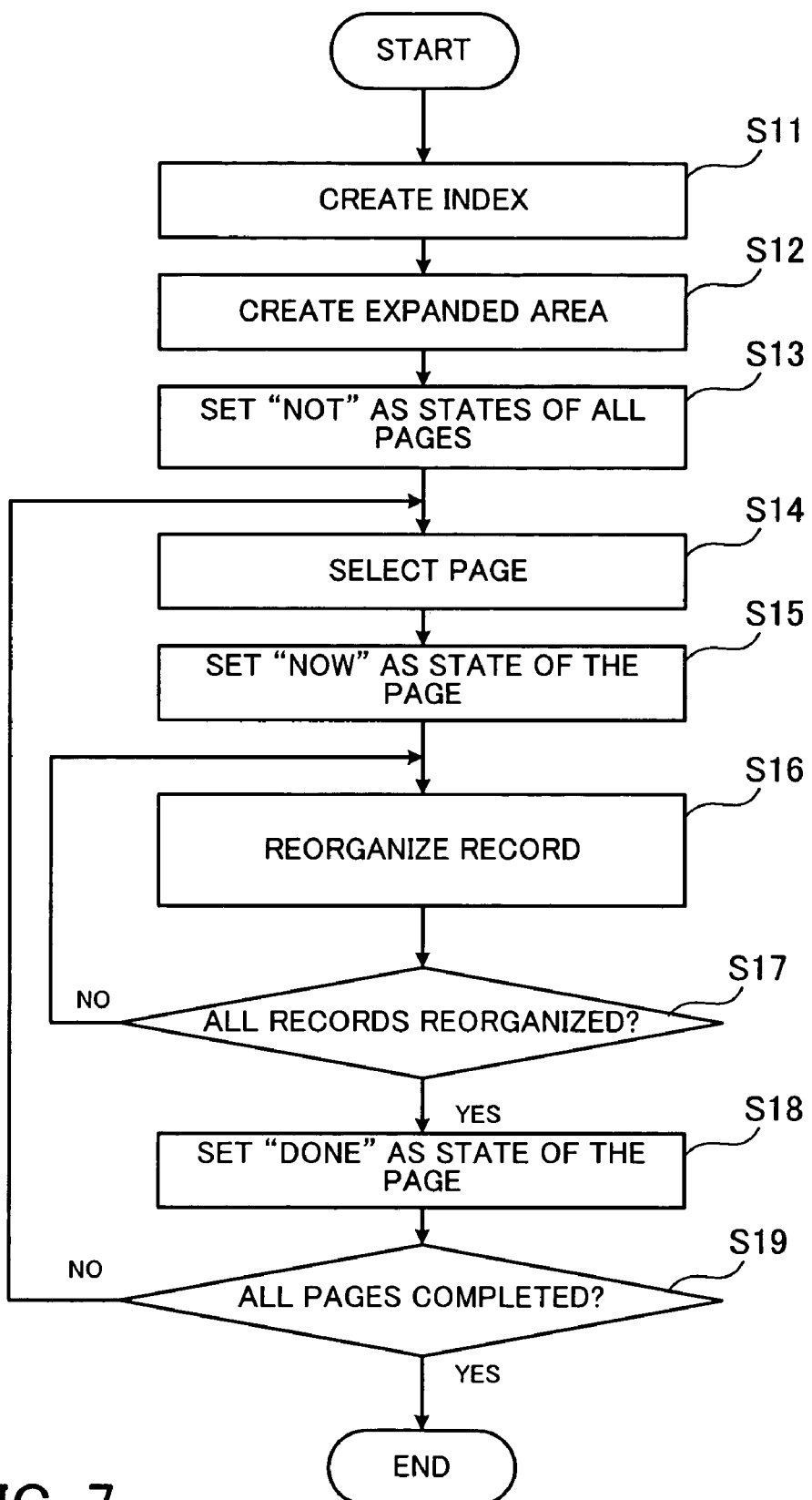
FIG. 7 is a flowchart of a database reorganization procedure.

FIG. 7 is a flowchart showing a procedure of the database reorganization. This procedure will be described following step numbers of FIG. 7.

(Step S11) The reorganization processor 110 creates the expansion index 550 defining an increased number of page numbers, in the storage device 500. That is, a prime page area capable of storing more than the records R1 to R6 shown in FIG. 5 is defined. This increases the capacity of the database 520 as well as increase in the number of prime pages.

(Step S12) The reorganization processor 110 creates the expanded area 522 based on the expansion index 550.

(Step S13) The reorganization processor 110 sets an unorganized state as the states of all pages in the page state table 120.

(Step S14) The reorganization processor 110 selects an unorganized prime page closest to the expanded area 522, out of the prime pages of the basic area 521 of the expanded database 520a.

(Step S15) The reorganization processor 110 changes the state of the prime page selected in step S14 into an under-reorganization state in the page state table 120.

(Step S16) The reorganization processor 110 reorganizes the records of the prime page selected in step S14 in the expanded database 520a. Specifically, the reorganization processor 110 records a record of the prime page selected in step S14 in the RAM 102 and deletes the record from the prime page. Then the reorganization processor 110 moves the record from the RAM 102 into a destination prime page with reference to the expansion index 550 created in step S11. It should be noted that the reorganization processor 110 reorganizes the records being stored in the overflow pages indicated by pointers being registered in the prime page selected in step S14 in the same way.

(Step S17) The reorganization processor 110 determines whether the records of the prime page selected in step S14 and the overflow pages indicated by the pointers have been all reorganized. When the records have been all reorganized (Yes), the process goes on to step S18. When some records have not been reorganized (No), the process returns back to step S16 to reorganize a next record.

(Step S18) The reorganization processor 110 changes the state of the prime page selected in step in S14 into a reorganized state in the page state table 120.

(Step S19) The reorganization processor 110 determines whether all the prime pages of the expanded database 520a have been reorganized. When yes, this procedure is completed. When no, the process goes back to step S14 to reorganize a next page.

As described above, the reorganization processor 110 performs the reorganization page by page and appropriately updates the page state table 120. This allows the online transaction processor 130 to recognize the current states of the prime pages with reference to the page state table 120. Therefore, even during the database reorganization, the online transaction processor 130 can update records in the database while recognizing the states of the prime pages.

Further, even if the contents of the page state table 120 are deleted by accident during the reorganization process, they are recovered by loading them from the table data storage unit 140 and the reorganization process can be continued.

Figure 8:
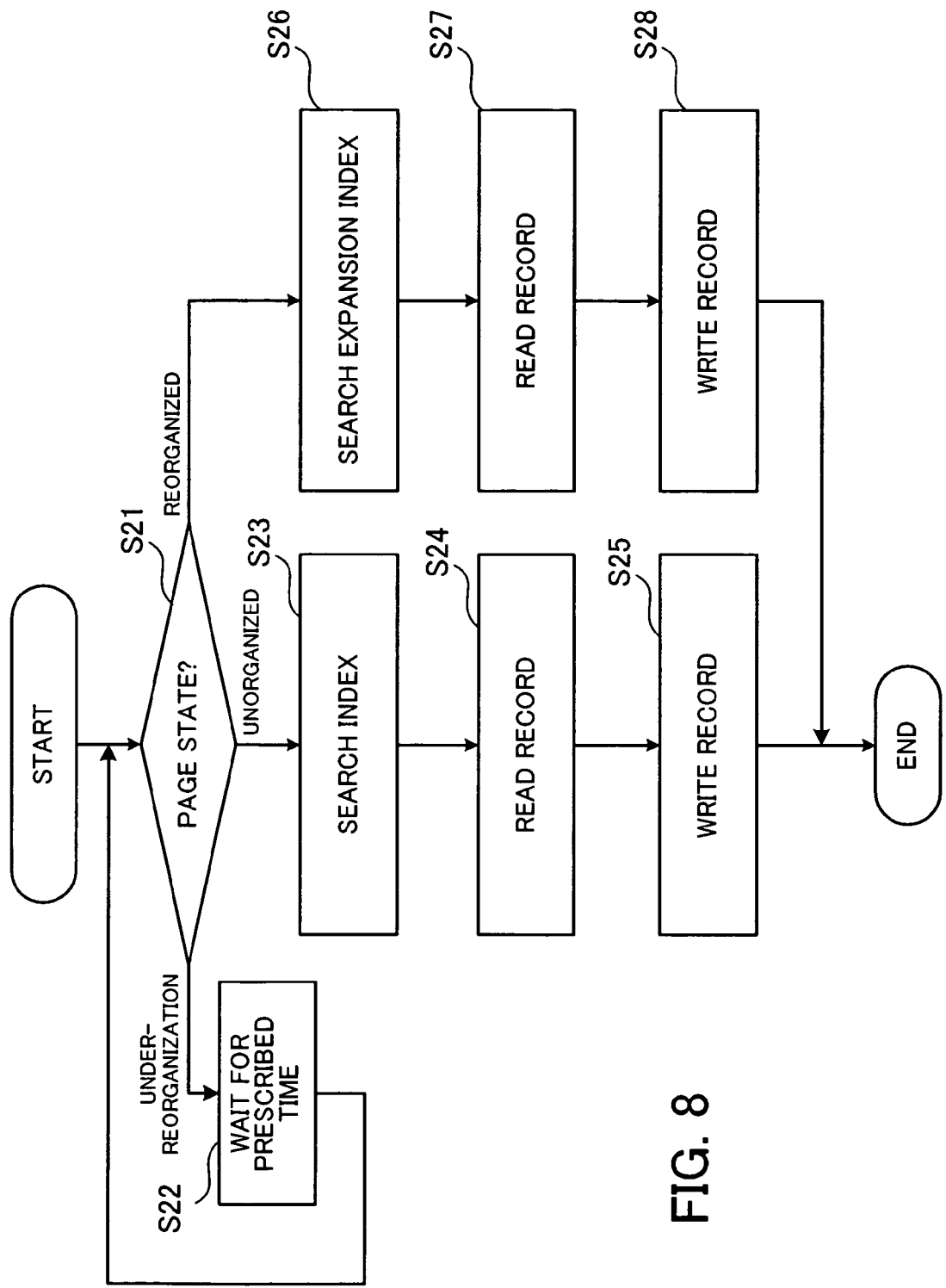
FIG. 8 is a flowchart of a record update procedure to be performed during database reorganization.

FIG. 8 is a flowchart of a procedure of record update to be performed during the database reorganization. This procedure will be described following step numbers of FIG. 8.

(Step S21) The online transaction processor 130 searches the index 510 for a corresponding prime page to a target record. The online transaction processor 130 recognizes the state of the prime page with reference to the page state table 120. When the state is an under-reorganization state, the process goes on to step S22. When the state is an unorganized state, the process goes on to step S23. When the state is a reorganized state, the process goes on to step S26.

(Step S22) The online transaction processor 130 waits for a prescribed time and the process goes back to step S21 to check the state of the prime page.

(Step S23) The online transaction processor 130 accesses the index 510.

(Step S24) The online transaction processor 130 reads the target record to be updated, from the expanded database 520a with reference to the index 510 accessed in step S23.

(Step S25) The online transaction processor 130 updates and writes the record read in step S24, in the expanded database 520a. Then this procedure is completed.

(Step S26) The online transaction processor 130 accesses the expansion index 550.

(Step S27) The online transaction processor 130 reads the target record to be updated, from the expanded database 520a with reference to the expansion index 550 accessed in step S26.

(Step S28) The online transaction processor 130 updates and writes the record read in step S27, in the expanded database 520*a*. Then this procedure is completed.

Since an index to be accessed is determined depending on the state of a prime page to be updated as described above, online transactions can be executed even during the database reorganization.

Figure 9:
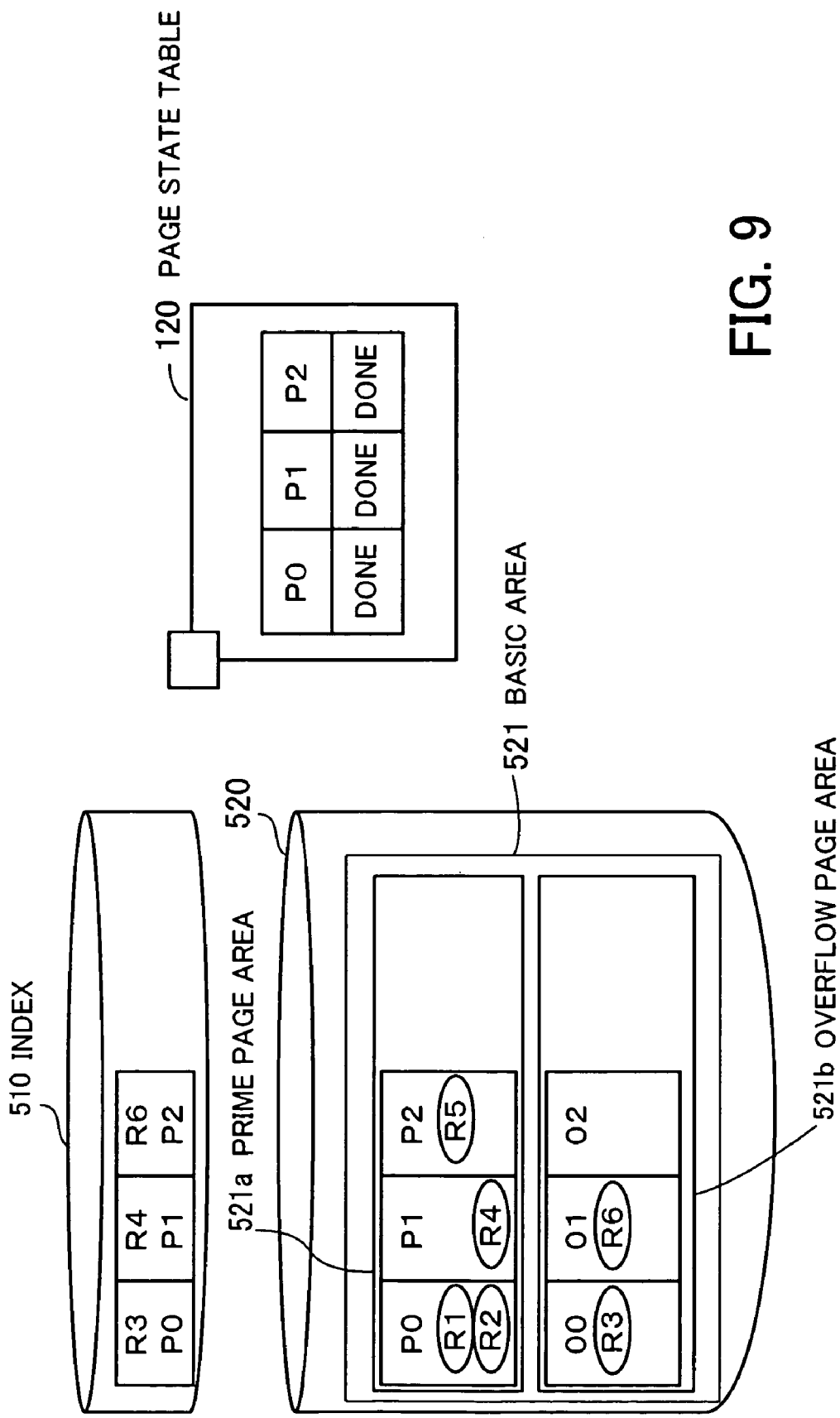
FIG. 9 is a conceptual view of a storage device before the reorganization is performed.

FIGS. 9 to 12 are conceptual views showing the specific database reorganization process. First, FIG. 9 is a conceptual view of a storage device before the reorganization process.

Referring to FIG. 9, a basic area 521 of an original database 520 has a prime page area 521*a* for storing plural prime pages and an overflow page area 521*b* for storing plural overflow pages. In this database 520, records R1 and R2 are stored in a page P0 of the prime page area 521*a*, a record R4 is stored in a page P1, and a record R5 is stored in a page P2. In addition, a record R3 is stored in a page 00 of the overflow page area 521*b* and a record R6 is stored in a page 01.

Figure 10:
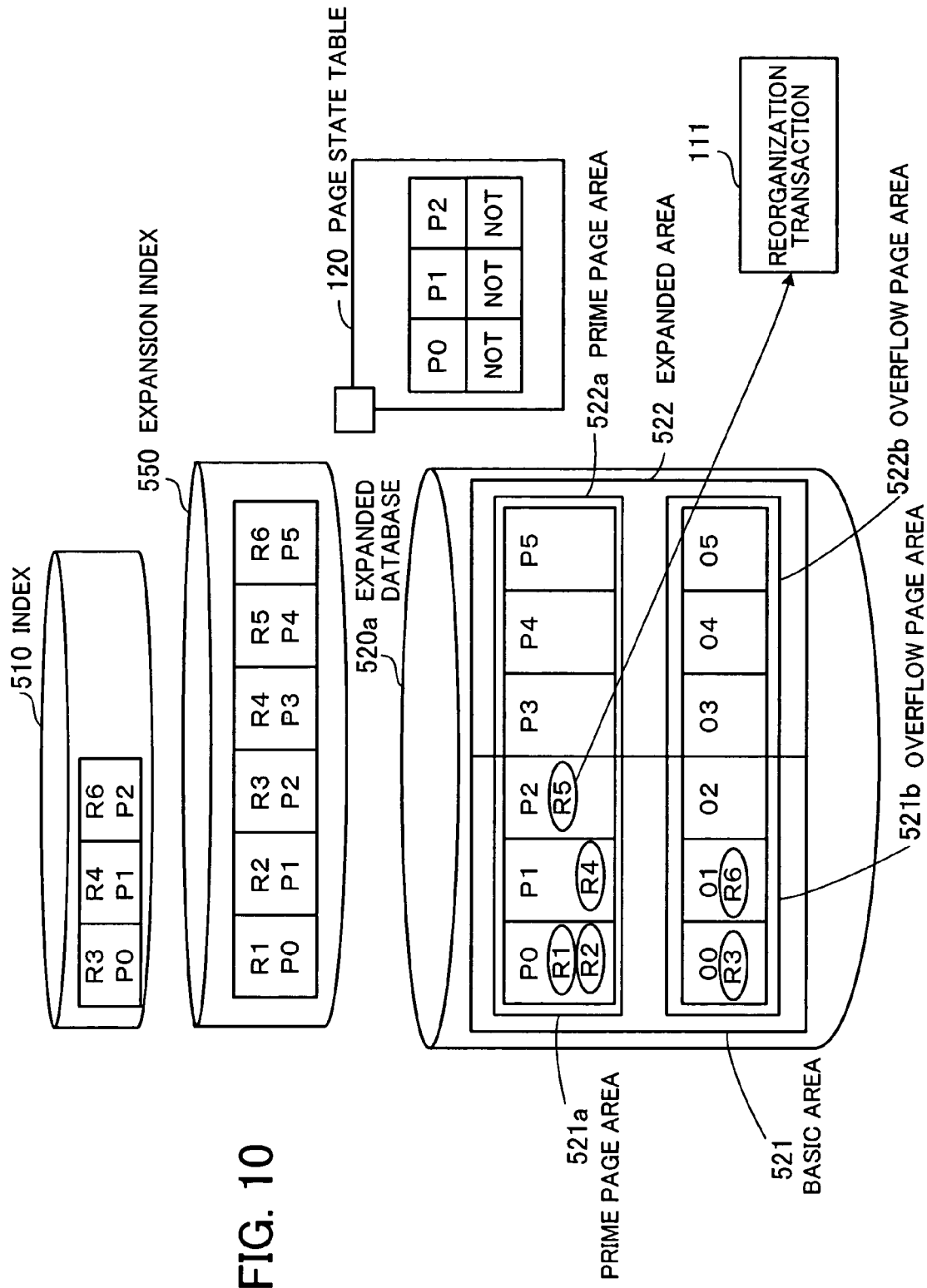
FIG. 10 is a conceptual view of the storage device when a reorganization command is issued.

FIG. 10 is a conceptual view of the storage device when a reorganization command is issued.

When a system manager issues a command for reorganizing the database 520, the reorganization processor 110 creates an expansion index 550 and an expanded area 522 having a prime page area 522*a* and an overflow page area 522*b* in the storage device 500. At this time, the reorganization processor 110 sets an unorganized state as the states of all pages in the page state table 120. Then the reorganization processor 110 starts the reorganization of the expanded database 520*a*.

Records are reorganized by a reorganization transaction 111 which is created for every prime page. The reorganization starts from a record being stored in the prime page of the basic area 521 closest to the expanded area 522.

Referring to FIG. 10, the reorganization starts from the record R5 being stored in the page P2. After the process for the page P2 is completed, the record being stored in the page P1 is processed. Records are reorganized one after another in the same way. In short, in the reorganization process, the records (records R6, R5, and R4) to be stored in the expanded area 522 are first moved in the pages (pages P5, P4, and P3) of the expanded area 522. Then the records (records R3, R2, R1) to be stored in the basic area 521 are moved in the pages (pages P2, P1, and P0) of the basic area 521, which stored the moved records.

Figure 11:
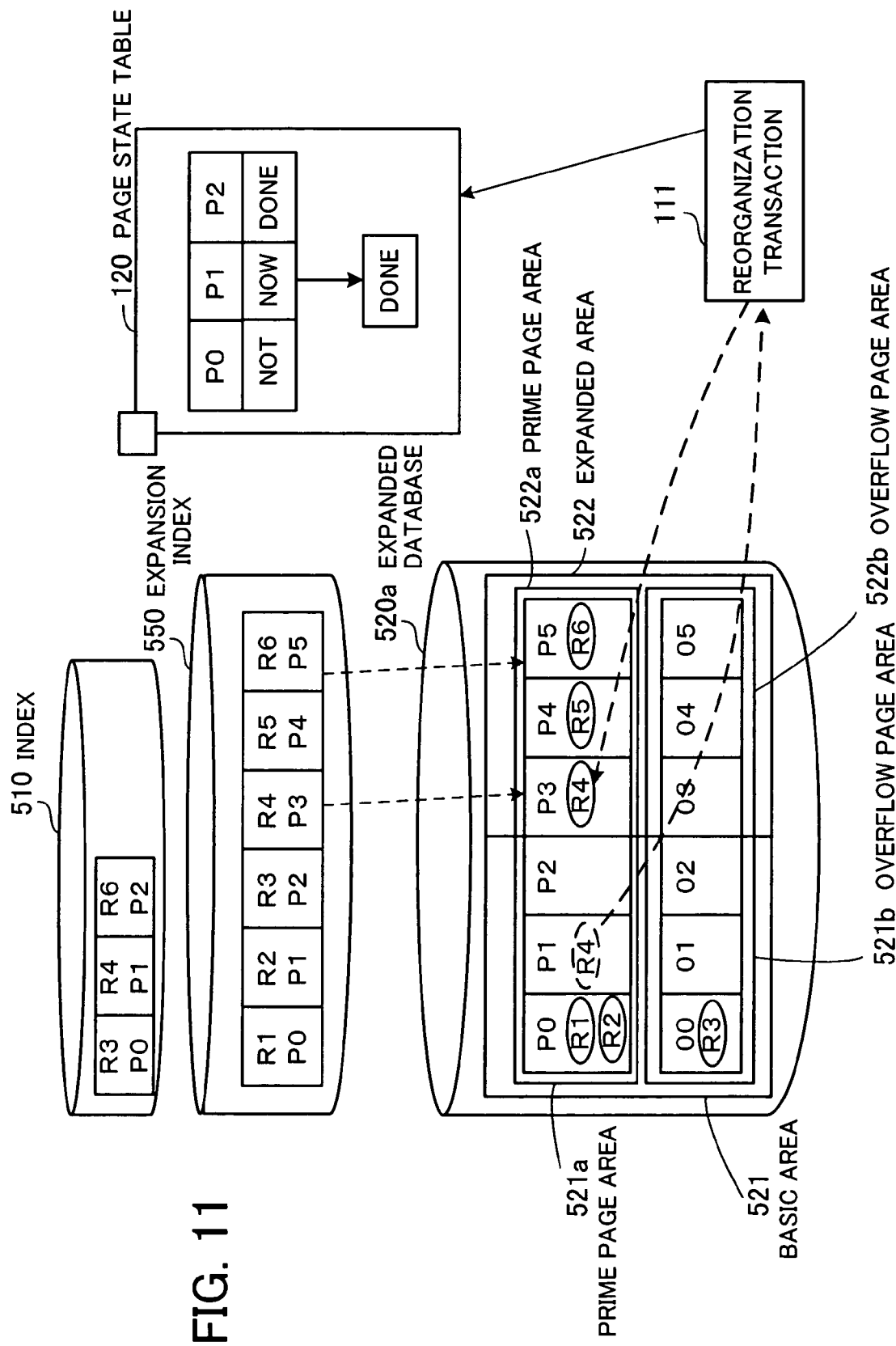
FIG. 11 is a conceptual view of the storage device when the reorganization is being performed.

FIG. 11 is a conceptual view of the storage device when the reorganization process is being preformed.

Referring to FIG. 11, it is recognized from the page state table 120 that the prime page P2 has been reorganized and the prime page P1 is under reorganization.

In the reorganization transaction 111, records are sequentially read from the corresponding prime page of the expanded database 520*a* and overflow pages associated with the prime page by pointers. In this example, the record R4 is read from the prime page P1.

Then the read record is written in the expanded database 520*a* with reference to the expansion index 550. In this example, since the expansion index 550 for the expanded database 520*a* associates the record R4 with the pages P3, this record R4 is written in the prime page P3.

After the record of the prime page P1 of the expanded database 520*a* and the record of the overflow page associated with the prime page P1 have been all stored in newly corresponding prime pages with reference to the expansion index 550, the state of this page (page P1 in this embodiment) is changed into Done, meaning a reorganized state, from Now, meaning an under-reorganization state, in the page state table 120. Now the reorganization transaction for one prime page is completed.

The reorganization processor 110 repeats reorganization transactions for the other prime pages in the same way in order to reorganize all records from the first page to the last page of the expanded database 520*a*.

Figure 12:
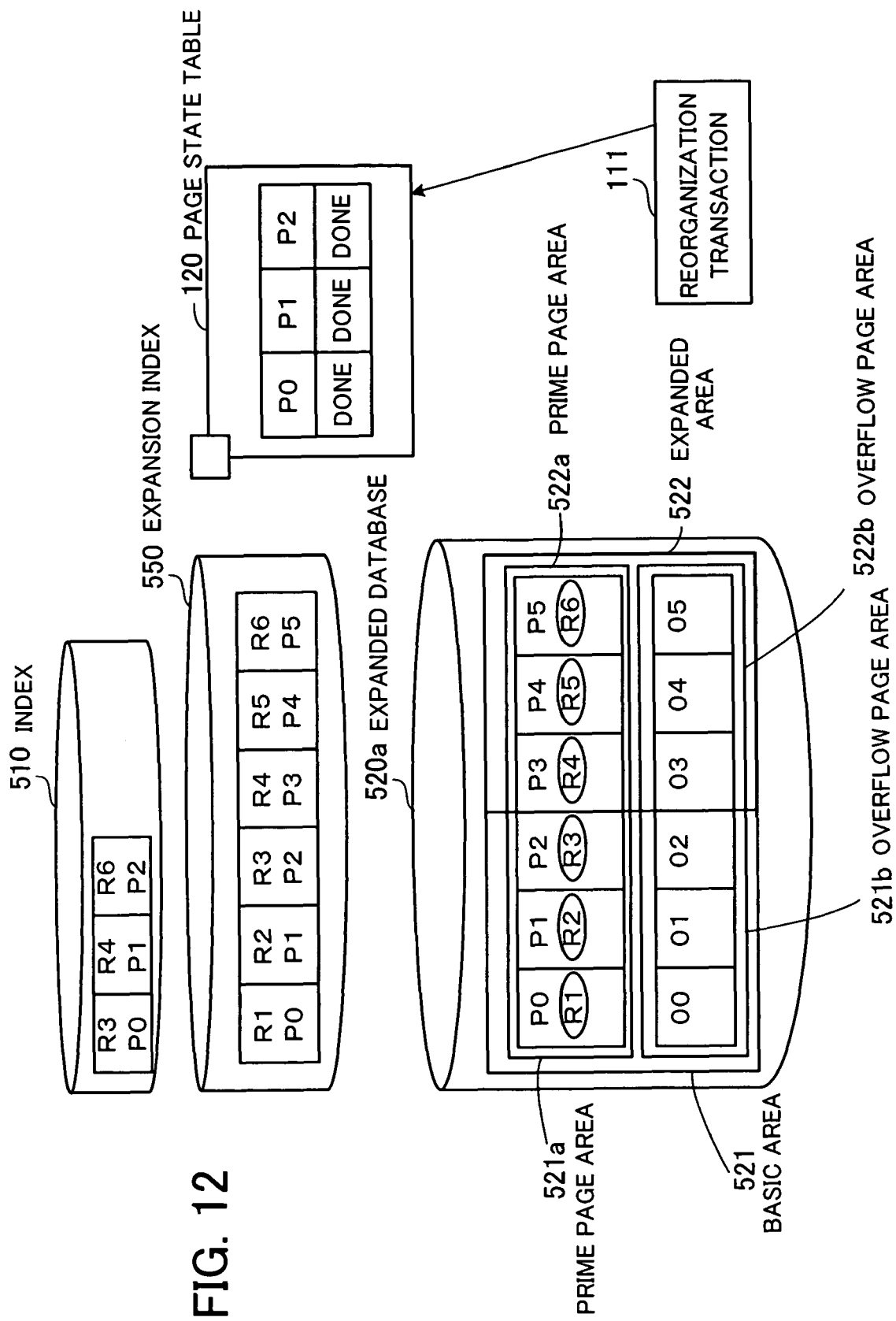
FIG. 12 is a conceptual view of the storage device when the reorganization has been completed.

FIG. 12 shows a conceptual view of the storage device after the reorganization.

When the page state table 120 shows Done, meaning a reorganized state, as the states of all the prime pages as shown in FIG. 12, the reorganization of the expanded database 520*a* is completed. In this embodiment, since the reorganization process is performed in order of prime pages P2, P1, and P0, this process is completed when the state of the prime page P0 is changed into Done.

Figure 13:
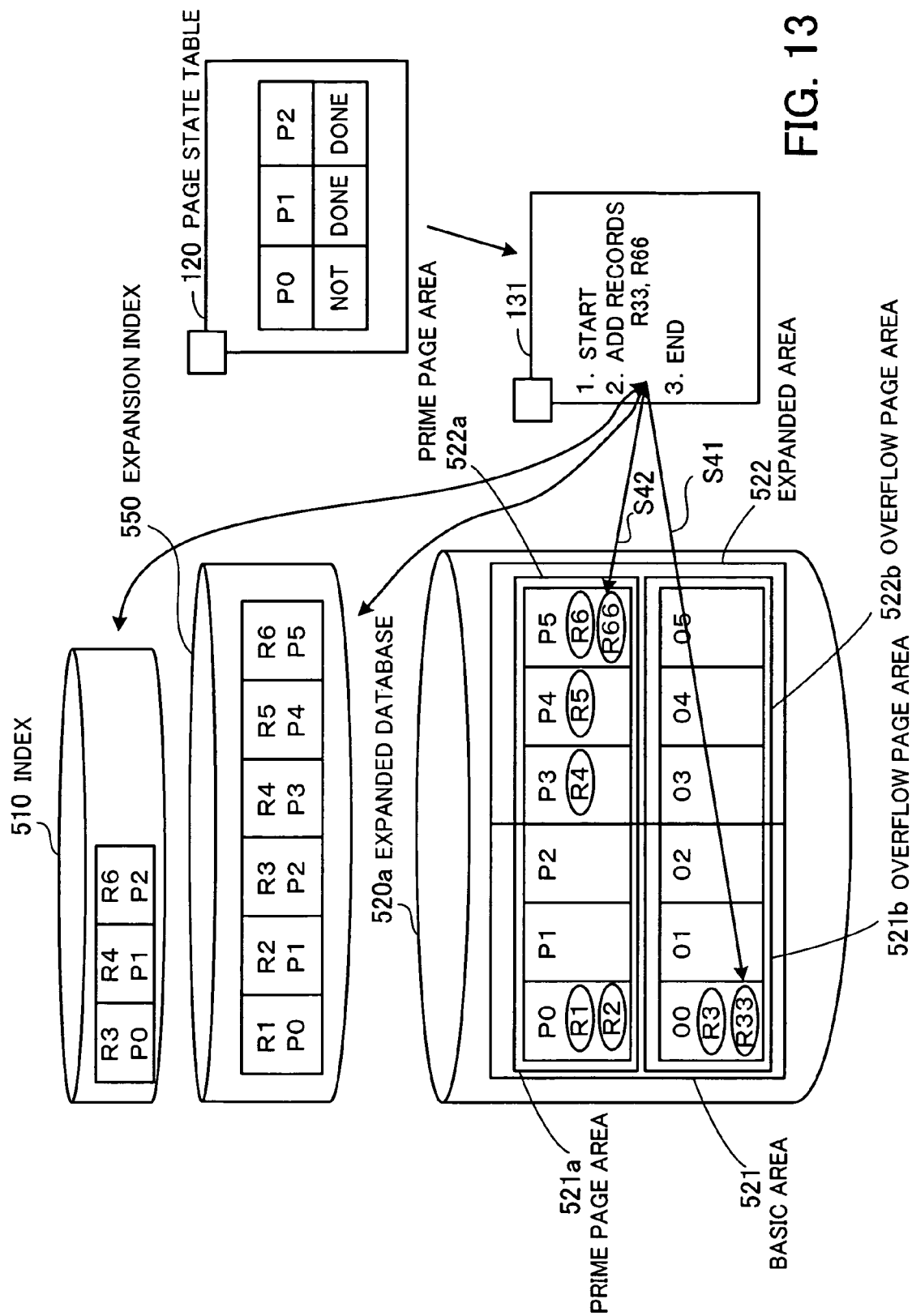
FIG. 13 is a conceptual view showing how to execute the database reorganization and an online transaction simultaneously.
Figure 14:
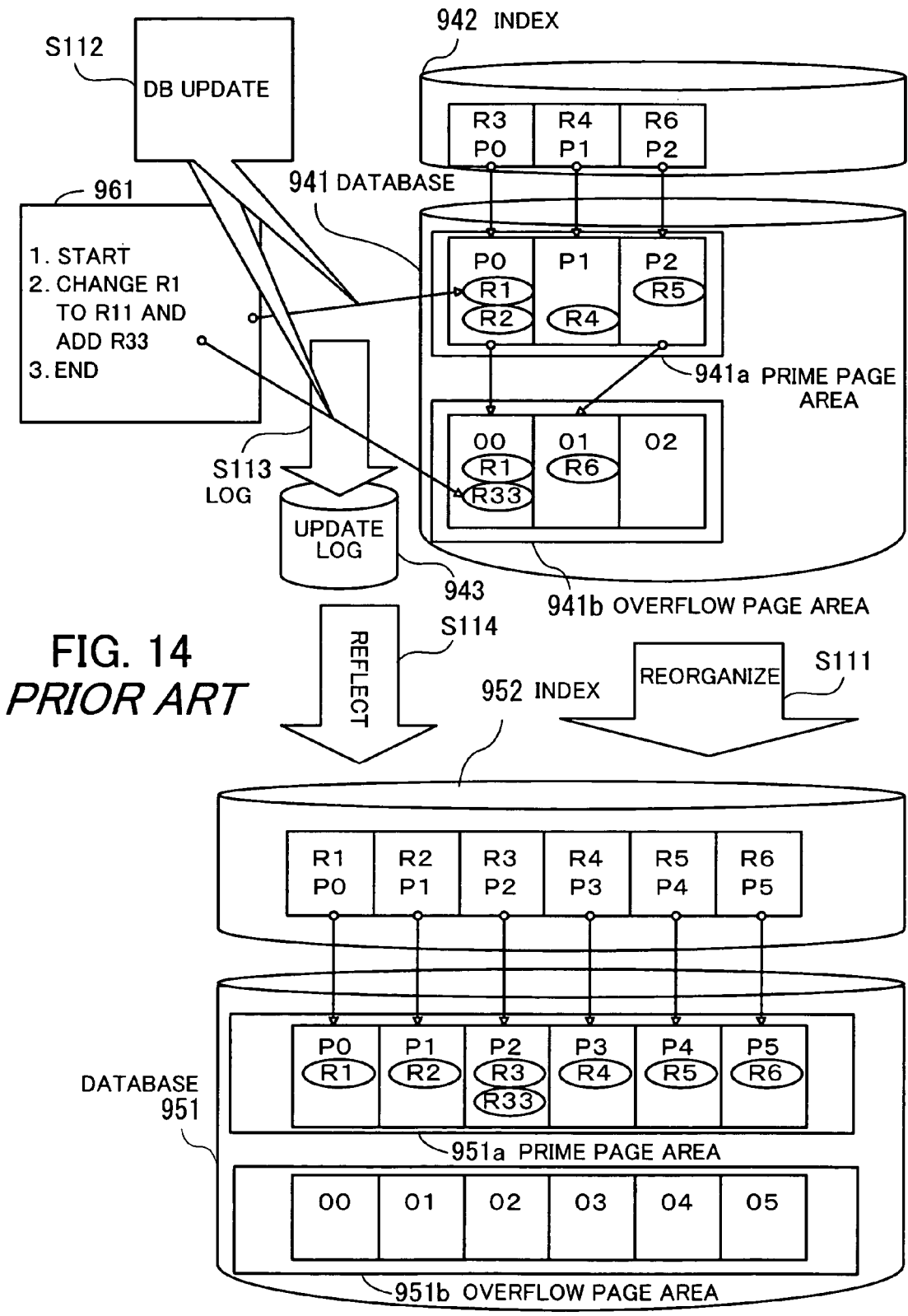
FIG. 14 shows a general database reorganization method in related art.

FIG. 13 is a conceptual view for showing how to simultaneously perform the database reorganization and an online transaction.

When the online transaction processor 130 receives a record update command from the terminal device 31 while reorganization is performed as shown in FIG. 11, it starts an online transaction 131. In this online transaction 131, the page state table 120 is searched for the state of a corresponding prime page. When the state is an unorganized state, the record is added in a final destination page of the expanded database 520*a* with reference to the index 510. When the state is a reorganized state, the record is added in a final destination page of the expanded database 520*a* with reference to the expansion index 550. When the state is an under-reorganization state, the online transaction 131 is performed after the corresponding page is reorganized and the state of the page becomes a reorganized state, under exclusive control.

FIG. 13 shows an example of a case where the online transaction processor 130 receives a command for updating records R3 and R6. To update the record R3 in the online transaction 131, the page state table 120 is searched for the state of a corresponding prime page P0. Since it is recognized that this page is unorganized, the index 510 is searched for a destination prime page, and by a pointer being registered by the prime page the record R3 is detected from an overflow page 00. Then the record R33 is added to this final destination overflow page 00 (step S41).

To update the record R6 in the online transaction 131, the page state table 120 is searched for the state of a corresponding prime page P2. Since it is recognized that this page has been reorganized, the expansion index 550 is searched for a final destination prime page P5. Then the record R6 is detected and the record R66 is added to this prime page P5 (step S42).

This technique which newly adds the expanded area 522 to create the expanded database 520*a* including the basic area 521 composing the original database 520 and the expanded area 522 and performs reorganization is enable to minimize additional memory consumption. That is, this technique does not necessarily create a different database with a larger capacity than an original database, resulting in minimizing the memory consumption.

Further, when the online transaction processor 130 receives a command for updating a record, it determines based on the page state table 120 whether the corresponding page is unorganized, under reorganization, or reorganized, and searches the index 510 or the expansion index 550 for a final destination page to update the record. Therefore, one transaction can be performed with a reduced number of updates, resulting in improving transaction performance.

Still further, since the reorganization is performed page by page which is the minimum unit, the database reorganization can be performed without interrupting online services. In addition, since the online transaction processor 130 logs the contents of written records in the update log 540 during the reorganization, the contents of the database 520 or the expanded database 520*a* can be recovered easily even if they are broken by accident such as abnormal shutdown of the host computer 100.

Still further, since the table data storage unit 140 for storing the contents of the page state table 120 in the shared memory 106 is prepared, the contents of the page state table 120 can be recovered easily even if they are broken by accident such as abnormal shutdown of the host computer 100, resulting in being capable of continuing the reorganization process.

According to this embodiment, the expanded area 522 is created based on the expansion index 550. As an alternative way, the expanded area 522 and then the expansion index 550 may be created.

The processing functions described above can be realized by a computer. In this case, a program is prepared, which describes processes for the functions to be performed by the host computer. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention as described above, an expanded area is newly added to an original database having a basic area, in order to create a new expanded database including the basic area, and then reorganization is performed. Therefore, additional memory consumption for the database reorganization can be minimized. In other words, a database with a lager capacity is not necessarily prepared differently from the original database, resulting in minimizing memory consumption by the database.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database reorganization program, stored in computer-readable recording medium, causing a computer to reorganize a database having plural basic pages in a basic area for storing records defined by an index, the database reorganization program causing the computer to perform functions comprising:
    an expanded database creation unit to create an expanded area to create an expanded database having the basic area and the expanded area, in response to a reorganization command for the database;
    an expansion index creation unit to create an expansion index redefining the records in order to store the records in the plural basic pages of the basic area and plural expanded pages of the expanded area;
    a record reorganization unit to select a basic page of the plural basic pages of the basic area, in order from the basic page closest to the expanded area, with reference to the index, move stored records of the basic page selected, into destination pages of the expanded database with reference to the expansion index, and update a page state table showing a reorganization progress for each of the plural basic pages of the expanded database;
    a record update unit to search the reorganization progress of the page state table for a state of a corresponding page to an update record in response to a command for writing the update record, and search the index for a final destination page when the state is an unorganized state or searching the expansion index for the final destination page when the state is a reorganized state, to write the update record in the final destination page of the expanded database;
    wherein the basic area of the database has plural prime pages for storing the records with record numbers previously defined and plural overflow pages for storing overflow records that cannot be stored in the plural prime pages,
    the expansion index creation unit creates the expansion index defining a larger number of records than a number of records stored in the plural prime pages and the plural overflow pages of the database, and
    the expanded database creation unit creates the expanded database on the basis of the expansion index created by the expansion index creation unit, the expanded database having a larger number of prime pages capable of storing all the records stored in the plural prime pages and the plural overflow pages of the database.

2. The database reorganization program according to claim 1, wherein the computer functioning as the record reorganization unit first moves some records to be stored in the expanded area, from the basic area to the expanded area, and then moves other records to be stored in the basic area.

3. The database reorganization program according to claim 2, wherein the computer functioning as the record reorganization unit moves the other records to be stored in the basic area, into the plural basic pages of the basic area that stored the records already moved, after the expanded area is organized.

4. The database reorganization program according to claim 1, wherein the computer functioning as the record reorganization unit successively stores contents of the page state table in a nonvolatile memory.

5. The database reorganization program according to claim 1, wherein the expanded database creation unit creates the expanded area based on the expansion index.

6. A database reorganization method for reorganizing a database having plural basic pages in a basic area for storing records defined by an index, wherein:
    expanded database creation means newly creates an expanded area to create an expanded database having the basic area and the expanded area, in response to a reorganization command for the database;

expansion index creation means creates an expansion index redefining the records in order to store the records in the plural basic pages of the basic area and plural expanded pages of the expanded area;

record reorganization means selects a basic page of the plural basic pages of the basic area, in order from the basic page closest to the expanded area, with reference to the index, moves stored records of the basic page selected, to destination pages of the expanded database with reference to the expansion index, and updates a page state table showing a reorganization progress for each of the plural basic pages of the expanded database; and record update means searches the reorganization progress of the page state table for a state of a corresponding page to an update record in response to a command for writing the update record, and searches the index for a final destination page when the state is an unorganized state or searches the expansion index for the final destination page when the state is a reorganized state, to write the update record in the final destination page of the expanded database;

wherein the basic area of the database has plural prime pages for storing the records with record numbers previously defined and plural overflow pages for storing overflow records that cannot be stored in the plural prime pages, the expansion index creation means creates the expansion index defining a larger number of records than a number of records stored in the plural prime pages and the plural overflow pages of the database, and the expanded database creation means creates the expanded database on the basis of the expansion index created by the expansion index creation means, the expanded database having a larger number of prime pages capable of storing all the records stored in the plural prime pages and the plural overflow pages of the database.

7. A database reorganization device for reorganizing a database having plural basic pages in a basic area for storing records defined by an index, comprising:

expanded database creation means for newly creating an expanded area to create an expanded database having the basic area and the expanded area, in response to a reorganization command for the database;

expansion index creation means for creating an expansion index redefining the records in order to store the records in the plural basic pages of the basic area and plural expanded pages of the expanded area;

record reorganization means for selecting a basic page of the plural basic pages of the basic area, in order from the basic page closest to the expanded area, with reference to the index, moving stored records of the page selected, into destination pages of the expanded database with reference to the expansion index, and updating a page state table showing a reorganization progress for each of the plural basic pages of the expanded database; and record update means for searching the reorganization state of the page state table for a state of a corresponding page to an update record in response to a command for writing the update record, and searching the index for a final destination page when the state is an unorganized state or searching the expansion index for the final destination page when the state is a reorganized state, to write the update record in the final destination page of the expanded database;

wherein the basic area of the database has plural prime pages for storing the records with record numbers previously defined and plural overflow pages for storing overflow records that cannot be stored in the plural prime pages, the expansion index creation means creates the expansion index defining a larger number of records than a number of records stored in the plural prime pages and the plural overflow pages, and the expanded database creation means creates the expanded database on the basis of the expansion index created by the expansion index created by the expansion index creation means, the expanded database having a larger number of prime pages capable of storing all records stored in the plural prime pages and the plural overflow pages of the database.

8. A computer readable recording medium recording a database reorganization program causing a computer to reorganize a database having plural basic pages in a basic area for storing records defined by an index, the database reorganization program causing the computer to function as:

expanded database creation means for newly creating an expanded area to create an expanded database having the basic area and the expanded area, in response to a reorganization command for the database;

expansion index creation means for creating an expansion index redefining the records in order to store the records in the plural basic pages of the basic area and plural expanded pages of the expanded area; record reorganization means for selecting a basic page of the plural basic pages of the basic area, in order from the basic page closest to the expanded one, with reference to the index, moving stored records of the basic page selected, into destination pages of the expanded database with reference to the expansion index, and updating a page state table showing a reorganization progress for each of the plural basic pages of the expanded database;

record update means for searching the reorganization progress of the page state table for a state of a corresponding page to an update record in response to a command for writing the update record, and searching the index for a final destination page when the state is an unorganized state or searching the expansion index for the final destination page when the state is a reorganized state, to write the update record in the final destination page of the expanded database;

wherein the basic area of the database has plural prime pages for storing the records with record numbers previously defined and plural overflow pages for storing overflow records that cannot be stored in the plural prime pages, the expansion index creation means creates the expansion index defining records more in quantity than the records stored in the plural prime pages and the plural overflow pages, and the expanded database creation means creates the expanded database on the basis of the expansion index created by the expansion index creation means, the expanded database having a larger number of prime pages capable of storing all records stored in the plural prime pages and the plural overflow pages of the database.

* * * * *